United States Patent
Maeda

(10) Patent No.: US 6,668,339 B1
(45) Date of Patent: Dec. 23, 2003

(54) MICROPROCESSOR HAVING A DEBUG INTERRUPTION FUNCTION

(75) Inventor: Shohei Maeda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/362,133

(22) Filed: Jul. 28, 1999

(51) Int. Cl.[7] .................................................. H02H 3/05
(52) U.S. Cl. .......................................... 714/38; 714/28
(58) Field of Search ............................. 714/38, 28, 29, 714/31, 34, 35, 45, 724, 734

(56) References Cited

U.S. PATENT DOCUMENTS

| | | | |
|---|---|---|---|
| 4,924,382 A | * 5/1990 | Shouda | 395/70 |
| 5,257,269 A | * 10/1993 | Hamauchi | 714/43 |
| 5,623,673 A | * 4/1997 | Gephardt et al. | 710/260 |
| 5,822,779 A | * 10/1998 | Intrater et al. | 711/168 |
| 5,943,498 A | * 8/1999 | Yano et al. | 395/704 |
| 5,978,937 A | * 11/1999 | Miyamori et al. | 714/45 |
| 6,457,124 B1 | * 9/2002 | Edwards et al. | 713/100 |

FOREIGN PATENT DOCUMENTS

| | | |
|---|---|---|
| JP | HEI 6-202901 | 7/1994 |
| JP | SHO 63-76023 | 4/1998 |

* cited by examiner

Primary Examiner—Dieu-Minh Le
(74) Attorney, Agent, or Firm—Burns, Doane, Swecker & Mathis, LLP

(57) ABSTRACT

In a microprocessor having a debug module and a JTAG unit based on the JTAG standards, there is provided a vector switching circuit in the CPU core which can switch a debug interruption vector address to a user space or to a system space. This vector switching circuit switches a debug interruption vector address depending upon the state of a debug module specified by a command inputted from external hardware such as an emulator via the JTAG interface. A user program can easily be debugged by allocating the debug program in the user space even if hardware such as an emulator is not connected to the microprocessor.

10 Claims, 3 Drawing Sheets

MICROPROCESSOR HAVING A DEBUG INTERRUPTION FUNCTION

FIELD OF THE INVENTION

The present invention relates to a microprocessor having a debug interruption function used when debugging a user program. More specifically, this invention relates to a microprocessor which makes it possible to easily debug a user program without requiring any specified hardware such as an emulator for that purpose.

BACKGROUND OF THE INVENTION

There is known a simulator system and an emulator system as representative methods for checking or debugging the programs during the development of programs for a microprocessor. In the simulator system, operations of a target microprocessor are simulated with software (a target program) on a host computer for assessing the target program.

In this simulator system, operations of a microprocessor chip and situations therearound are modeled by simulating the operations or situations utilizing the target program, so that the simulator system has no physical connection with a system (target system) having a microprocessor as an object for debugging. Because there is no physical connection with a system (target system) having the microprocessor, it is difficult to accurately simulate a state caused by an interruption processing actually generated in the target system. Therefore, usually the emulator system is used for checking or debugging a more advanced program including the interruption processing.

In the emulator system, operations of a microprocessor in a target system having chips each mass produced and incorporated in an application device respectively (described as mass production chip hereinafter) are emulated utilizing an emulator, and a program for the target system is checked and debugged by realizing the operating state.

Herein a work for debugging with an emulator is generally executed using a debug program. This debug program is booted each time reset interruption or interruption for a break command or the like is generated. The debug program analyzes, when the user program is interrupted due to the interruption, various execution parameters at a point of time when execution of the user program is interrupted.

The interruption as described above is controlled by a CPU (Central Processing Unit) of the microprocessor, so that also the debug program is started in association with the interruption processing by this CPU. The processing for starting a debug program is described below.

When a reset interruption or a break command is generated during execution of a user program in an environment in which the emulator is connected to a target system, the CPU of the microprocessor stores an address of a command next to the command currently being executed in a stack, and sets the address at an interruption vector of a vector table in a program counter (PC). Execution of the user program is interrupted with this processing.

An address stored in the interruption vector indicates a start address of a debug program. The CPU executes the debug program by repeating command fetch with respect to the address set in the program counter. When a return command is executed in the debug program, the address stored in the stack is set in the program counter, and the user program is restored from the interrupted state.

As described above, when debugging a user program run on a microprocessor, environment in which the two programs, namely a user program and a debug program can be operated alternately is required. Therefore, generally an address area to be used by a user (described as a user space hereinafter) namely an area for storage and operation of a user program, and an address area used for debugging (described as a system space hereinafter) namely an area for storage and operations of a debug program are completely separated from each other.

In recent years, there has been developed and put into practical use a microprocessor having the JTAG (Joint Test Action Group) interface based on the IEEE1149.1 standards and enabling a boundary scan test and debugging. In this microprocessor, an interruption vector for debugging is prepared, and it is possible to serially provide a debug program via the JTAG interface.

When debugging a microprocessor having the JTAG interface as described above, at first a target system having a microprocessor to be debugged is connected to the emulator based on the JTAG, and a work address area for debugging is set in the system space. When the CPU receives the debug interruption described above, the CPU waits for supply of commands each constituting the debug program from the JTAG interface, and executes these supplied commands one by one.

In development of microprocessor products in recent years, an emulation chip for checking operations of software for mass production chips as well as for operations of peripheral devices is developed prior to development of the mass production chips themselves. Especially microprocessors now available from the market have the same CPU but different peripheral functions, so that an emulator for the target product comprises a CPU emulator for the CPU section and an emulator for the peripheral functions. Thus, emulation for various types of microprocessor can be executed by changing only the emulator for the peripheral functions.

However, it is very inefficient to develop an emulator for the peripheral functions for each product. In order to solve this problem, each chip incorporates a circuit for realizing functions of an emulation chip therein and is designed in such a away that the chip can operate as an emulator for peripheral functions in response to a level of a signal inputted from the outside.

When debugging a microprocessor capable of being run as an emulation chip as a target system, a debug program can be supplied in parallel via an interface for signal input/output to and from the outside for operating the chip as an emulator (described as an emulation interface hereinafter). In such a case, an emulator that incorporates an emulation chip and also which has an emulation interface is required.

In the microprocessor as described above, however, a specific hardware environment such as an emulator is required in order to access the system, so that it has been impossible to debug a user program by utilizing the debug interruption functions prepared in the CPU in a simple manner.

SUMMARY OF THE INVENTION

It is an object of the present invention to provide a microprocessor capable of debugging a user program by effectively utilizing the interruption function in a simple manner without requiring any specific hardware such as an emulator.

With the present invention, using a vector address switching unit provided in a CPU core, a first address or a second address can selectively specified as a debug interruption vector address as desired, so that either the first address or the second address can be allocated to an address area accessible by a user as an area for storage of a debug program.

With the present invention, the first address and the second address each capable of being selectively specified by the vector address switching unit are allocated as an address in an address area accessible for a user and an address in an address area for debugging respectively.

With the invention, conditions for interruption different from the debug interruption functions previously prepared in a microprocessor (for instance, in a CPU core) are monitored, and a debug module for debugging a user program according to a debug program specifies an address switched by the vector address switching unit according to a debug module signal, so that the address can be switched in correlation to start of the debug module.

With the present invention, a JTAG unit and a JTAG interface is provided, and when a prespecified command is inputted into the JTAG unit via the JTAG interface, the JTAG unit shifts the debug module to an enabled state, so that address switching by the vector address switching unit can be specified by external hardware such as an emulator connected to the JTAG interface.

With the present invention, a debug program is written in an address area in which a first address is present in correlation to execution of a user program, so that debug programs for various types of debug processing can selectively be executed.

With the present invention, address switching by the vector address switching unit is executed in response to a switching signal outputted from a combining unit according to a combination of states of mode signals inputted from a plurality of mode terminals, so that the first address or the second addresses can selectively be specified as a debug interruption vector address regardless of whether any specific hardware such as an emulator is connected or not.

With the present invention, a debug module has an enable bit which can be updated (changed) via a system bus (data bus or address bus), and when this enable bit is updated to the enabled state, conditions for interruption different from the debug interruption functions originally prepared in a microprocessor (for instance, in a CPU core) are monitored, and a user system is debugged according to a debug program, so that conditions for interruption can be switched by making use of the system bus.

With the present invention, when a specified command is inputted into the JTAG unit via the JTAG interface, the JTAG unit rewrites an enable bit of a debug module to a signal indicating the enabled state, so that conditions for interruption can be updated (changed) with an external hardware such as an emulator connected to the JTAG interface.

With the present invention, a microprocessor has a function for operating the microprocessor as a mass production chip and a function for operating the microprocessor as an emulation chip, and specifies the vector address switching unit to switch to the first address or to the second address as a debug interruption vector address, so that debug processing can be executed without requiring any specific mechanism such as a debug module or a JTAG unit.

Other objects and features of this invention will become understood from the following description with reference to the accompanying drawings.

DESCRIPTION OF THE PREFERRED EMBODIMENTS

Detailed description is made hereinafter for the preferred embodiments of the microprocessor according to the present invention with reference to the attached drawings. It should be noted that the present invention is not limited by the embodiments.

Figure 1:
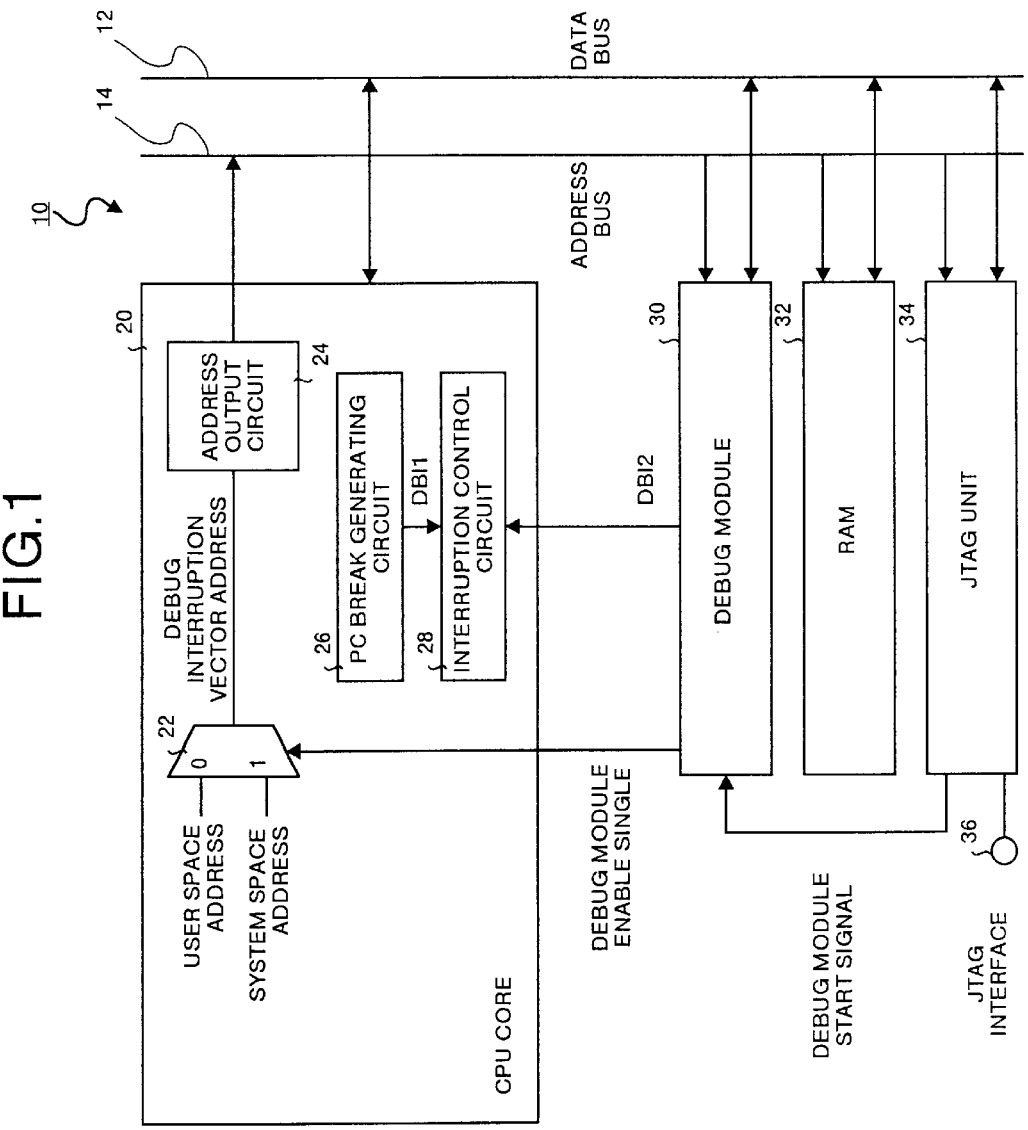
FIG. 1 is a block diagram showing a general configuration of a microprocessor according to Embodiment 1 of the present invention.

A microprocessor according to Embodiment 1 of the present invention is explained below. FIG. 1 is a block diagram showing a general configuration of the microprocessor according to Embodiment 1. The microprocessor 10 shown in FIG. 1 comprises a CPU core 20, a debug module 30, a RAM 32, and a JTAG unit 34. This microprocessor 10 may include a cache memory, a memory controller, general purpose input/output ports, a PLL (Phase Locked Loop) clock generating circuit, and an external interface unit as components other than those shown in FIG. 1. Thus, only the sections representing the characteristics of the present invention are shown in FIG. 1.

The CPU core 20 comprises a vector address switching circuit 22, an address output circuit 24, a PC break generating circuit 26, and an interruption control circuit 28. This CPU core 20 also has components included in a conventional type of CPU core such as an ALU (Arithmetic and Logical Unit), a PC (Program Counter), various types of registers, and a sum of products operating unit (accumulator or the like), however, such components have been omitted from FIG. 1 so that the characteristics of the present invention may easily be understood.

In the CPU core 20, the vector address switching circuit 22 is a circuit which selects either an address preset in a user space or an address preset in a system space as a debug interruption vector address. This vector address switching circuit 22 is controlled according to a debug module enable signal output from the debug module 30.

The PC break generating circuit 26 is a circuit which outputs a PC break interruption signal (DBI1) as one of types of debug interruption. A PC break interruption is an interruption generated when a position at which a user program is interrupted is preset as a PC break pointer value in the PC break generating circuit 26 before the debug operation is started and a program counter value in the CPU core 20 coincides with the PC break point value.

The interruption control circuit 28 is a circuit for setting a debug interruption vector address selected in the vector address switching circuit 22 in a program counter (not shown) according to input of the above mentioned PC break interruption signal (DBI1) or of a debug interruption signal (DBI2) described later.

The debug interruption vector address set in the program counter is sent to an address bus 14 at a specified timing by the address output circuit 24. Then, a debug program with a debug interruption vector address as a start address is sent to a data bus 12 as sequential instruction code, and the CPU core 20 acquires this instruction code from the data bus 12 and executes this code.

The debug module 30 is a circuit which monitors the address bus 14 and the data bus 12 and outputs a debug interruption signal (DBI2) to be asserted when access is made to the bus to a particular address or data or when an interruption signal is inputted from an external DBI terminal.

Although FIG. 1 shows a case where the PC break generating circuit 26 is incorporated in the CPU core 20, the PC break generating circuit 26 may be incorporated in the debug module 30.

The RAM 32 is a memory in which a user program as an object for debugging or in which a debug program as a user space is stored therein. This RAM 32 is used as a work memory when the user program or the debug program is executed.

The JTAG unit 34 is a circuit which inputs or outputs information into or from an external emulator connected thereto via the JTAG interface 36 (such as a TCK terminal, a TDI terminal, a TDO terminal, a TMS terminal, or a/TRST terminal) based on JTAG. The debug program inputted from the JTAG interface 36 is sent to the data bus 12 at a specified timing by this JTAG unit 34 and this debug program is acquired by the CPU core 20.

Operation of this microprocessor 10 are described here. A case is explained first in which the debug module 30 is in an enabled state. This case corresponds to a case in which the user program is debugged in a state where an emulator (not shown) is connected to the JTAG interface 36. When the emulator is connected to the JTAG interface 36, both the DBI1 signal and DBI2 signal can be generated, and if either one of the signals is asserted, debug interruption is received in the interruption control circuit 28 of the CPU core 20.

When the emulator is connected to the microprocessor 10, and if a command to start the debug module 30 is inputted from the emulator to the JTAG interface 36, the JTAG unit 34 asserts a debug module start signal.

When the debug module 30 receives the asserted debug module start signal from the JTAG unit 34, it shifts into an enabled state and also asserts a debug module enable signal. The debug module enable signal is inputted into the vector address switching circuit 22.

When the vector address switching circuit 22 receives the asserted debug module enable signal ("1") it selects an address preset in the system space as a debug interruption vector address. In this state, when the DBI1 signal or the DBI2 signal is input into the interruption control circuit 28, the debug interruption vector address located in the system space is set in the program counter, and this address is sent to the address bus 14 by the address output circuit 24.

The JTAG unit 34 is allocated to a resource of the system space, and the CPU core 20 reads a program supplied from the emulator via the JTAG interface 36 and executes this program.

Next, a case is explained in which the debug module 30 is in a disabled state. The debug module 30 is generally operating in this state, and corresponds to a case in which emulator or the like is not connected to the JTAG interface 36. Even if an emulator is connected to the JTAG interface 36, when the emulator does not issue a command to start the debug module 30 it is regarded that the case is the same to a case in which the emulator is not connected to the JTAG interface 36. Thus, when the emulator is not connected, the debug module enable signal is negated.

Herein, when receiving the negated debug module enable signal ("0"), the vector address switching circuit 22 selects an address preset in the user space as a debug interruption vector address. As the debug module 30 does not function in this state, only the DBI1 signal can be generated.

Therefore, when the DBI1 signal is inputted into the interruption control circuit 28, the debug interruption vector address located in the user space is set in the program counter, and sent to the address bus 14 by the address output circuit 24.

Assuming that a RAM 32 is allocated to a resource of the user space, it is required to transfer a debug program in which processing required on generation of the DBI1 signal is previously described onto a debug interruption vector address of the RAM 32, but the above requirement can be realized by preparing a program with the transfer processing of a debug program described therein and making the program executed on execution of the user program.

The above mentioned operation indicates that the debug operation can be carried out even when the emulator is not connected to the JTAG interface 36, therefore, in this microprocessor 10, it is possible to use either the highly developed debugging using an emulator or the comparatively easy debugging based on only internal processing as required. The debugging particularly the latter one based on the internal processing can be capable of the highly developed debugging by preparing a debug program as complicated as the resource of the RAM 32 allows.

As a debugging method, a user program is often executed in a single step using a PC break function. Such a single step execution generally requires an emulator. However, in the microprocessor 10 according to Embodiment 1, the debug operation in a single step or the like is possible by using the PC break function (which corresponds to output of the DBI1 signal) without any emulator connected thereto.

As described above, in the microprocessor 10 according to Embodiment 1, in the microprocessor with a debug module 30 and a JTAG unit 34 based on JTAG provided therein, a CPU core 20 has a vector address switching circuit 22 for enabling switching of a debug interruption vector address to that in a user space or to that in a system space provided therein, and the vector address switching circuit 22 switches the debug interruption vector address according to the state of the debug module 30 (enable state or disable state) decided by a command inputted from the emulator via a JTAG interface 36. Therefore by locating a debug program in the user space, a user program can be debugged even when the emulator is not connected, which allows debug interruption to quickly and easily be utilized in the microprocessor 10 according to the present invention.

A microprocessor according to Embodiment 2 is described here. The microprocessor according to Embodiment 2 is different from the microprocessor 10 according to Embodiment 1 in that, a combining circuit for receiving a mode signal from an external device is provided therein. Further, a switching signal outputted from this combining circuit is used instead of a debug module enable signal to control the vector address switching circuit 22, and a debug module enable bit of a debug module 30 to be written therein via a data bus 12 is used instead of a debug module start signal for starting the debug module 30.

Figure 2:
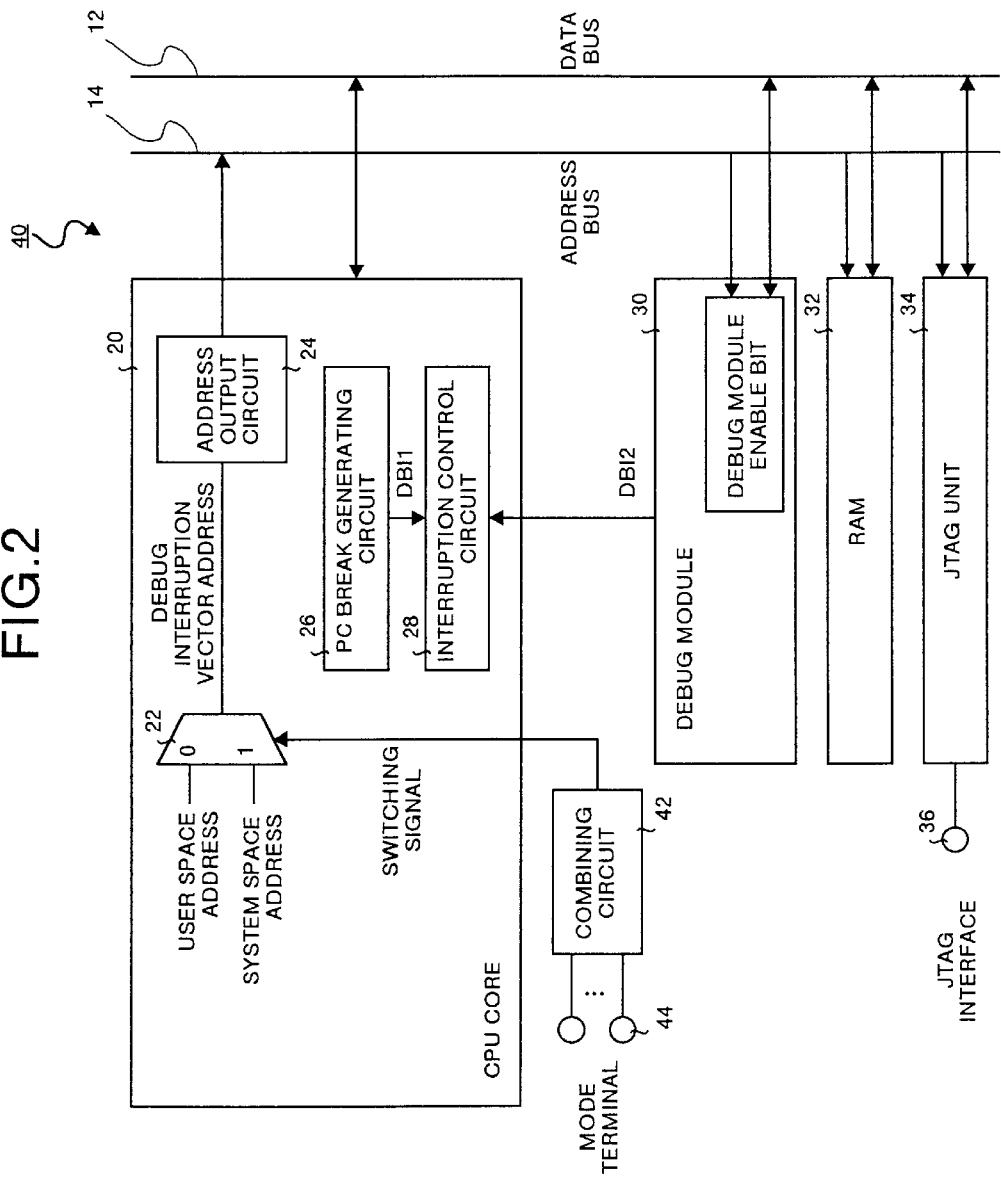
FIG. 2 is a block diagram showing a general configuration o a microprocessor according to Embodiment 2 of the present invention.

FIG. 2 is a block diagram showing a general configuration of the microprocessor according to Embodiment 2 of the present invention. In FIG. 2, the same reference numerals are assigned to components corresponding to those in FIG. 1, and description thereof is omitted herein. In the microprocessor 40 shown in FIG. 2, a combining circuit 42 is a circuit for inputting an asserted switching signal into the vector address switching circuit 22 when signals inputted into a plurality of mode terminals 44 make a specified combination.

The conventional type of microprocessor generally has a plurality of mode terminals for setting operation modes such as a normal mode and a test mode, and each of signals inputted into these plurality of mode terminals is analyzed by a decoder which has a function for outputting an asserted signal to a specified circuit. Such a decoder may be used as the combining circuit 42, and especially when any combination not allocated exists in the decoder, there is also no need to additionally provide a mode terminal for outputting the switching signal therein.

The debug module 30 has an area for storing a debug module enable bit indicating an enable state or a disable state, and in Embodiment 2, the state of the debug module enable bit can be rewritten via the data bus 12.

Operations of the microprocessor 40 are described here. A case is explained first in which the debug module 30 is in an enabled state. This case corresponds to a case in which the user program is debugged in a state where an emulator (not shown) is connected to the JTAG interface 36. When the emulator is connected to the JTAG interface 36, both the DBI1 signal and DBI2 signal can be generated, and if either one of the signals is asserted, debug interruption is received in the interruption control circuit 28 of the CPU core 20.

When the emulator is connected to the microprocessor 40, and if a command to start the debug module 30 is inputted from the emulator to the JTAG interface 36, the JTAG unit 34 sends an address indicating specification of an area with a debug module enable bit for the debug module 30 stored therein to the address bus 14, and also sends a signal to assert the debug module enable bit (e.g., bit "1") to the data bus 12.

The debug module 30 acquires this signal and asserts the debug module enable bit. Namely, with this operation the debug module 30 shifts to the enabled state.

Herein, when the combining circuit 42 analyzes that the mode signal inputted into the mode terminal 44 is a mode to assert the switching signal, an asserted switching signal ("1") is inputted into the vector address switching circuit 22.

When the vector address switching circuit 22 receives the asserted switching signal ("1") as described above it selects an address preset in the system space as a debug interruption vector address. In this state, when the DBI1 signal or the DBI2 signal is inputted into the interruption control circuit 28, the debug interruption vector address located in the system space is set in the program counter, and this address is sent to the address bus 14 by the address output circuit 24.

The JTAG unit 34 is allocated to a resource of the system space, and the CPU core 20 reads a program supplied from the emulator via the JTAG interface 36 and executes this program.

On the other hand, when the combining circuit 42 analyzes that the mode signal inputted into the mode terminal 44 is a mode to negate the switching signal, a negated switching signal ("0") is inputted into the vector address switching circuit 22.

When the vector address switching circuit 22 receives the negated switching signal ("0") it selects an address preset in the user space as the debug interruption vector address. Different from Embodiment 1, because the debug module 30 is enabled in this state, the DBI2 signal can also be generated in addition to the DBI1 signal. The operation after the DBI1 signal or the DBI2 signal is inputted into the interruption control circuit 28 is the same as those described above.

Assuming that a RAM 32 is allocated to a resource of the user space, as described in Embodiment 1, transfer processing of a debug program (a processing which is required on generation of the DBI1 signal or the DBI2 signal is previously described on a debug interruption vector address of the RAM 32) is executed in association with execution of, for example, the user program.

Next, a case is explained in which the debug module 30 is in a disabled state. The debug module 30 is generally operating in this state, and corresponds to a case in which emulator or the like is not connected to the JTAG interface 36. Even if an emulator is connected to the JTAG interface 36, when the emulator does not issue a command to start the debug module 30 it is regarded that the case is the same to a case in which the emulator is not connected to the JTAG interface 36. Thus, when the emulator is not connected, the debug module enable bit is negated (e.g., bit "0").

It is also possible to select whether an address located in the user space or an address located in the system space is to be used as a debug interruption vector address according to the state of a switching signal outputted from the combining circuit 42 based on a mode signal inputted into the mode terminal 44 as described above. However, the emulator is not connected to the JTAG interface 36, therefore when the JTAG unit 34 is allocated as the system space, the asserted switching signal will have no meaning.

In this case, therefore, when the debug module 30 is in a disabled state, it is possible to avoid the above mentioned case by adding a circuit for inputting a negated signal into the vector address switching circuit 22 whatever may be the state of a switching signal outputted from the combining circuit 42. For example, the circuit may be configured by providing an AND gate which receives a switching signal outputted from the combining circuit 42 and a signal indicating a debug module enable bit for the debug module 30, and inputting the output of this AND gate into the vector address switching circuit 22 as a new switching signal.

As described above, in the microprocessor 40 according to Embodiment 2, in the microprocessor having a debug module 30 and a JTAG unit 34 based on JTAG, a CPU core 20 has a vector address switching circuit 22 for enabling switching of a debug interruption vector address to that in a user space or to that in a system space provided therein, and the vector address switching circuit 22 switches the debug interruption vector address according to a switching signal outputted from a combining circuit 42 based on mode signals inputted into a plurality of mode terminals 44. Therefore, by locating a debug program in the user space, a user program can be debugged even when the emulator is not connected, and when the emulator is connected, either one of a program allocated to the user space and a program allocated to the system space can be selected as a debug program to be executed, which allows debug interruption to flexibly and easily be utilized in the microprocessor 40 according to the present invention.

A microprocessor according to Embodiment 3 is described here. The microprocessor according to Embodiment 3 is different from the microprocessor 10 according to Embodiment 1 in that, the debug module 30, JTAG unit 34, and JTAG interface 36 are not provided therein. Further, an emulation chip signal indicating whether this microprocessor operates as a mass production chip or operates as an emulation chip is used instead of a debug module enable signal to controlling the vector address switching circuit 22.

Figure 3:
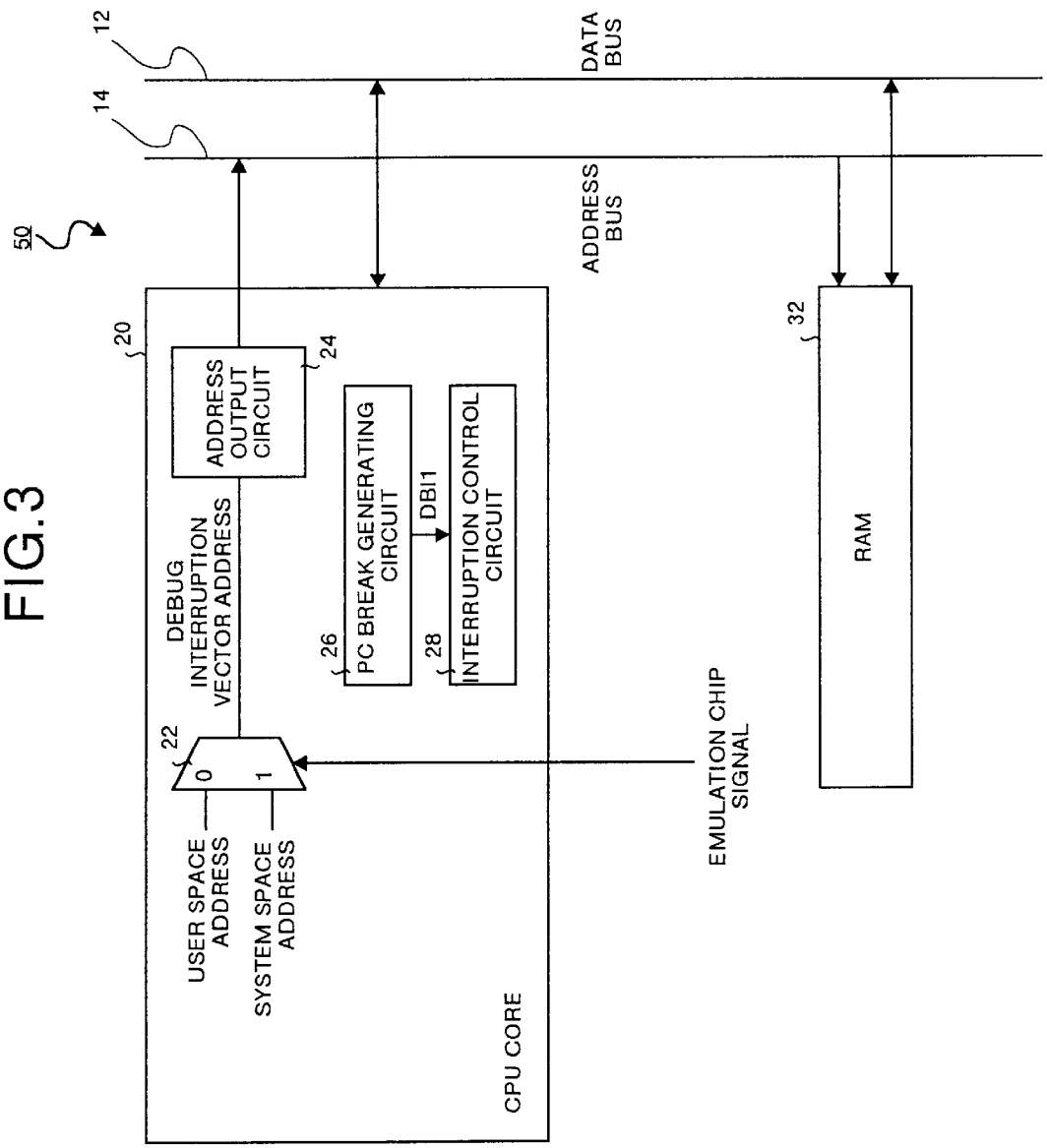
FIG. 3 is a block diagram showing a general configuration of a microprocessor according to Embodiment 3.

FIG. 3 is a block diagram showing a general configuration of the microprocessor according to Embodiment 3 of the present invention. In FIG. 3, the same reference numerals are assigned to components corresponding to those in FIG. 1, and description thereof is omitted herein. As described above, there has been a case where the conventional type of microprocessor is supplied as an emulation chip having a function of emulation, and this emulation chip is configured in many cases so that the chip can operate as amass production chip by a chip mode signal generally given from an external device.

There the microprocessor 50 is configured in such a manner that a signal (called "emulation ship signal" hereinafter) indicating a chip mode (an emulation chip mode or a mass production chip mode) such as the above mentioned chip mode signal is inputted into the vector address switching circuit 22 and switching of a debug interruption vector address is performed according to a state of this emulation chip signal.

Operations of the microprocessor 50 are described here. At first, an emulation chip signal is asserted ("1"), through which the microprocessor 50 operates as an emulation chip. Then, this emulation signal is inputted into the vector address switching circuit 22.

When the vector address switching circuit 22 receives the asserted switching signal ("1") as described above it selects an address preset in the system space as a debug interruption vector address. In this state, when the DBI1 signal is inputted into the interruption control circuit 28, the debug interruption vector address located in the system space is set in the program counter, and this address is sent to the address bus 14 by the address output circuit 24.

A memory area with a debug program preprepared as one of emulation functions stored therein is allocated to a resource of the system space. This memory area may be a ROM (Read Only Memory) or may be realized by allocating a specified area in a RAM 32 to which a debug program for the emulation mode is transferred in association with execution of a user program as described above.

On the other hand, when the emulation chip signal is negated ("0") and the microprocessor 50 operates as a mass production chip, the negated emulation chip signal ("0") is inputted into the vector address switching circuit 22, and the address preset in the user space is selected as a debug interruption vector address.

When the DBI1 signal is inputted into the interruption control circuit 28 in this state, the debug interruption vector address located in the user space is set in the program counter, and this address is sent to the address bus 14 by the address output circuit 24.

Assuming that a RAM 32 is allocated to a resource of the user space, as described in Embodiment 1, transfer processing of a debug program (a processing which is required on generation of the DBI1 signal is previously described on a debug interruption vector address of the RAM 32) is executed in association with execution of, for example, the user program.

As described above, in the microprocessor 50 according to Embodiment 3, in the microprocessor operable as a mass production chip and an emulation chip, a CPU core 20 has a vector address switching circuit 22 for enabling switching of a debug interruption vector address to that in a user space or to that in a system space provided therein, and the vector address switching circuit 22 switches the debug interruption vector address according to an emulation chip signal indicating whether the microprocessor 50 operates as a mass production chip or operates as an emulation chip. Therefore, by locating a debug program in the user space, a user program can be debugged without requiring a particular hardware environment such as an emulator even when the microprocessor operates as a mass production chip, which allows debug interruption to quickly and easily be utilized in the microprocessor 50 according to the present invention.

As described above, with the present invention, a vector address switching unit for selectively specifying a first address or a second address as a debug interruption vector address is provided in a CPU core, so that the first address or the second address can be allocated to an address area accessible by a user as an area for storage of a debug program, which makes it possible for users to use an area requiring specific hardware such as an emulator for access thereto for debugging and interruption in a simple manner.

With the present invention, the first address and the second address each capable of being selectively specified by a vector address switching unit are allocated as an address in an address area accessible for a user and an address in an address area for debugging respectively, so that a debug program to be executed can be selected according to an environment for debugging regardless of whether any specific hardware is required for debugging or not.

With the invention, a debug module is provided for monitoring conditions for interruption different from the debug interruption functions previously prepared in a microprocessor (for instance, in a CPU core) and debugging a user program according to a debug program specifies an address switched by the vector address switching unit according to a debug module signal, so that the address can be switched in correlation to start of the debug module according to a debug module signal outputted from this debug module, therefore, sophisticated debugging can be executed in a simple mariner according to a debug program located in an address area dedicated for debugging.

With the present invention, when a prespecified command is inputted into the JTAG unit via the JTAG interface, the JTAG unit shifts the debug module to an enabled state, so that address switching by the vector address switching unit can be specified by external hardware such as an emulator connected to the JTAG interface, therefore, shifting to a debug program with external hardware can smoothly be executed.

With the present invention, a debug program is written in an address area in which a first address is present in correlation to execution of a user program, so that debug programs for various types of debug processing can selectively be executed without fixing the debug program, and because of this configuration a result of debugging having a high reliability can be obtained.

With the present invention, address switching by the vector address switching unit is executed in response to a switching signal from the combining unit for outputting a switching signal according to a combination of states of mode signals inputted from a plurality of mode terminals, so that the first address or the second addresses can selectively be specified as a debug interruption vector address regardless of whether any specific hardware such as an emulator is connected or not, therefore, debug interruption can be executed in a simple manner.

With the present invention, a debug module has an enable bit which can be updated (changed) via a system bus (data bus or address bus), and when this enable bit is updated to the enabled state, conditions for interruption different from the debug interruption functions originally prepared in a microprocessor (for instance, in a CPU core) are monitored, and the user system is debugged according to a debug program, so that conditions for interruption can be switched by making use of the system bus and also sophisticated debugging can be executed in which the debug program located in an address area dedicated for debugging.

With the present invention, there are provided a JTAG unit and a JTAG interface, and when a specified command is inputted into the JTAG unit via a JTAG interface, the JTAAG unit updates (changes) the enable bit of the debug module to a signal indicating the enabled state, so that conditions for interruption can be updated with external hardware such as an emulator connected to the JTAG interface and also shifting to execution of a debug program with external hardware can smoothly be executed.

With the present invention, a microprocessor has a function for operating as a mass production chip and a function for operating as an emulation chip, and specifies the vector address switching unit to switch to the first address or to the second address as a debug interruption vector address in a case where the microprocessor operates as a mass production chip and in a case where the microprocessor operates as an emulation chip respectively, so that a user program can easily be debugged by specifying the first address as a user-accessible address area and locating a debug program in this address area without requiring any specific hardware environment such as an emulator even when the microprocessor works as a mass production chip and thus debug interruption can be executed in a simple manner.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A microprocessor comprising:
   a CPU core for executing a program, said CPU core including:
      a program counter break generating circuit generating a program counter break interruption signal when a program is interrupted at a preset portion;
      a vector address switching unit for switching a debug interruption vector address to a first address of a first program or to a second address of a second program based upon a signal indicating whether an emulator is connected to the microprocessor and is enabled, and
      an interruption control circuit for setting the debug interruption vector address into a program counter based upon one of the program counter break interruption signal and a debug interruption signal.

2. A microprocessor according to claim 1; wherein the first address is the address located in an address area available for a user; and
   the second address is the address located in an address area for debugging.

3. A microprocessor according to claim 2; wherein a debug program written in association with execution of the user program is stored in the address area in which the first address is located.

4. A microprocessor according to claim 1 comprising:
   a debug module for monitoring conditions for interruption which are different from those for the debug interruption function and debugging a user program according to a debug program; wherein
   said debug module inputs a debug module signal for instructing switching to the first address as a debug interruption vector address to the vector address switching unit in the disabled state, and also inputs a debug module signal for instructing switching to the second address as a debug interruption vector address to the vector address switching unit in the enabled state.

5. A microprocessor according to claim 4 comprising a JTAG (Joint Test Action Group) unit and a JTAG interface;
   wherein a start signal for enabling a debug module is inputted into said debug module when a specified command is inputted through the JTAG interface into the JTAG unit.

6. A microprocessor according to claim 4; wherein a debug program written in association with execution of the user program is stored in the address area in which the first address is located.

7. A microprocessor according to claim 1 comprising:
   a combining unit for inputting a switching signal for instructing switching to the first address or to the second address as a debug interruption vector address into said vector address switching unit depending upon a combination of the states of the mode signals inputted from a plurality of mode terminals.

8. A microprocessor according to claim 7 comprising a debug module having an enable bit which may be updated via a system, wherein
   when this enable bit indicates an enable state said debug module monitors conditions for interruption different from those for the debug interruption function and also debugs a user program according to a debug program.

9. A microprocessor according to claim 8 comprising a JTAG (Joint Test Action Group) unit and a JTAG interface; wherein
   when a specified command is inputted via said JTAG interface into said JTAG unit then the enable bit is updated to a signal indicating enabled state of said debug module via the system.

10. A microprocessor according to claim 1 comprising:
    a function for operating the microprocessor as a mass production chip; and
    a function for operating the microprocessor as an emulation chip; wherein
    when operating the microprocessor as the mass production chip an emulation chip signal for instructing switching to the first address is inputted as a debug interruption vector address into said vector address switching unit, and when operating the microprocessor as the emulation chip unit an emulation chip signal for instructing switching to the second address is inputted as a debug interruption vector address into said vector address switching unit.

* * * * *